US012587086B2

(12) United States Patent
Wang et al.

(10) Patent No.: US 12,587,086 B2
(45) Date of Patent: Mar. 24, 2026

(54) HOLD-UP TIME EXTENSION FOR TOTEM POLE BRIDGELESS POWER FACTOR CORRECTION

(71) Applicant: Dell Products L.P., Round Rock, TX (US)

(72) Inventors: Danny SC Wang, New Taipei (TW); Rita Joy Fernandez Miranda, Taipei (TW); Alex Tsai, Taipei (TW); Eva Chao, New Taipei (TW); Dennis Alinea Martin, New Taipei (TW)

(73) Assignee: Dell Products L.P., Round Rock, TX (US)

( * ) Notice: Subject to any disclaimer, the term of this patent is extended or adjusted under 35 U.S.C. 154(b) by 284 days.

(21) Appl. No.: 18/496,186

(22) Filed: Oct. 27, 2023

(65) Prior Publication Data

US 2025/0141346 A1 May 1, 2025

(51) Int. Cl.
| | |
|---|---|
| *H02M 1/00* | (2007.01) |
| *H02M 1/42* | (2007.01) |
| *H02M 3/158* | (2006.01) |

(52) U.S. Cl.
CPC ........... *H02M 1/0096* (2021.05); *H02M 1/42* (2013.01); *H02M 1/4233* (2013.01); *H02M 3/158* (2013.01)

(58) Field of Classification Search
CPC ............... H02M 3/158; H02M 1/0096; H02M 1/42–4291
See application file for complete search history.

(56) References Cited

U.S. PATENT DOCUMENTS

| | | | |
|---|---|---|---|
| 7,061,212 B2 | 6/2006 | Phadke | |
| 7,729,143 B2 | 6/2010 | Lin et al. | |
| 8,134,849 B2 | 3/2012 | Chang et al. | |
| 8,736,240 B2 | 5/2014 | Liu et al. | |
| 2010/0014330 A1* | 1/2010 | Chang ................. | H02M 7/2176 |
| | | | 363/89 |

FOREIGN PATENT DOCUMENTS

| | | | | |
|---|---|---|---|---|
| CN | 110572058 A | * | 12/2019 | ............ H02M 7/217 |
| EP | 3588758 A1 | * | 1/2020 | .............. H02J 9/061 |
| WO | WO-2017181091 A1 | * | 10/2017 | .............. H02M 1/32 |
| WO | WO-2020123654 A1 | * | 6/2020 | ......... H02M 1/4225 |

OTHER PUBLICATIONS

CN110572058 Translation (Year: 2019).*

* cited by examiner

Primary Examiner — Thienvu V Tran
Assistant Examiner — Jennifer C Caulk
(74) *Attorney, Agent, or Firm* — McDermott Will & Schulte LLP

(57) ABSTRACT

In one or more embodiments, a PSU comprises a bridgeless PFC circuit with a hold-up time extension. If a voltage drop is detected, a relay switches operation to a first boost converter action to store energy in a PFC choke. If voltage remains low, the PFC choke may transfer energy to a bulk capacitor, increasing the amount of time an information handling system can operate before a shut-down procedure needs to start. If power returns, selected switches are turned on in an order such that an inrush current does not damage components in the PSU.

16 Claims, 8 Drawing Sheets

HOLD-UP TIME EXTENSION FOR TOTEM POLE BRIDGELESS POWER FACTOR CORRECTION

BACKGROUND

Field of the Disclosure

This disclosure relates generally to information handling systems and more particularly to power factor correction circuits.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Embodiments may be directed to a hold-up time extension circuit for a power factor correction (PFC) circuit in a power supply unit (PSU) of an information processing system. The hold-up time extension circuit may comprise a relay between a power source and a PFC choke; a first branch connected to a first pole of the relay, the first branch comprising a hold-up capacitor; and a second branch connected to a second pole of the relay, the second branch comprising: a first sub-branch comprising a first switch and an inrush resistor between the first switch and the relay; and a second sub-branch comprising a second switch connected to the first branch between the inrush resistor and the relay. In some embodiments, the relay is a single pole dual throw (SPDT) relay. In some embodiments, one or more of the first switch and the second switch comprises a metal-oxide semiconductor field-effect transistor. In some embodiments, in a first configuration associated with power received from the power source dropping below a first voltage level, the relay activates the first branch, wherein power from the hold-up capacitor energizes a bulk capacitor; and in a second configuration associated with receiving power from the power source, the relay activates the second branch to charge the hold-up capacitor. In some embodiments, in the second configuration, a first step comprises power flowing through the first sub-branch and a second step comprises power flowing through the second sub-branch. In some embodiments, the hold-up time extension circuit further comprises an electromagnetic interference (EMI) filter between the power source and the PFC choke.

Embodiments may be generally directed to a power factor correction (PFC) circuit in a power supply unit (PSU) of an information processing system. The PFC circuit may comprise a bulk capacitor; a PFC choke; a plurality of switches; and a hold-up time extension circuit comprising: a relay between a power source and the PFC choke, wherein in a first configuration associated with normal operation, a first branch connected to a first pole of the relay, the first branch comprising a hold-up capacitor; and a second branch connected to a second pole of the relay, the second branch comprising: a first sub-branch comprising a first switch and an inrush resistor between the first switch and the relay; and a second sub-branch comprising a second switch connected to the first branch between the inrush resistor and the relay.

In some embodiments, the relay is a single pole dual throw (SPDT) relay. In some embodiments, one or more of the first switch and the second switch comprises a metal-oxide semiconductor field-effect transistor. In some embodiments, in a first configuration associated with power received from the power source dropping below a first voltage level, the relay activates the first branch, wherein power from the hold-up capacitor energizes a bulk capacitor; and in a second configuration associated with receiving power from the power source, the relay activates the second branch to charge the hold-up capacitor. In some embodiments, in the second configuration, a first step comprises power flowing through the first sub-branch and a second step comprises power flowing through the second sub-branch. In some embodiments, the PFC circuit further comprises an electromagnetic interference (EMI) filter between the power source and the PFC choke.

Embodiments may be generally directed to a method of operating a power supply unit (PSU) comprising a first switch, a second switch, a third switch, a fourth switch, a bulk capacitor and a power factor correction (PFC) choke forming a PFC circuit. The method may comprise detecting an input voltage corresponding to at least a nominal voltage; and configuring a relay for normal operation, wherein a first node of the relay connects an electromagnetic interference (EMI) filter to the PFC choke and the first switch, the second switch, the third switch and the fourth switch are turned on and a fifth switch and a sixth switch associated with a hold-up circuit are turned off. In some embodiments, in response to detecting a drop in the input voltage below a minimum operating threshold voltage, the method comprises: the relay switching connection from the first node to a second node connecting the hold-up capacitor, the fifth switch, and an inrush resistor; and turning off the fifth switch and the sixth switch, wherein the circuit defined by the hold-up capacitor, the PFC choke, the third switch, the fourth switch and the bulk capacitor form a boost circuit such that voltage corresponding to the bulk capacitor is maintained to keep the converter operating in regulation. In some embodiments, the relay switching connection occurs after current in the PFC choke goes to 0 Amps. In some embodiments, the method further comprises transferring energy stored in the PFC choke to the bulk capacitor, comprising turning the third switch off and the fourth switch on. In some embodiments, the method further comprises determining the input voltage is greater than a minimum threshold voltage; configuring the relay to switch from the second node to the first node, wherein the fifth switch and the sixth switch remain off, wherein the PFC circuit operates to increase the voltage in the hold-up capacitor, wherein capacitance of the hold-up capacitor is less than the capacitance of the bulk capacitor. In some embodiments, once a voltage in the PFC circuit returns to the nominal voltage, the method further comprises turning the sixth switch on to charge the hold-up capacitor to the same voltage as the bulk capacitor, wherein the inrush resistor limits the charging current to the old-up capacitor; once the voltage in the hold-up capacitor equals the voltage in the bulk capacitor, turning the fifth switch on to bypass the inrush resistor, wherein the bulk capacitor and the hold-up capacitor are in parallel.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which.

DETAILED DESCRIPTION

Figure 1:
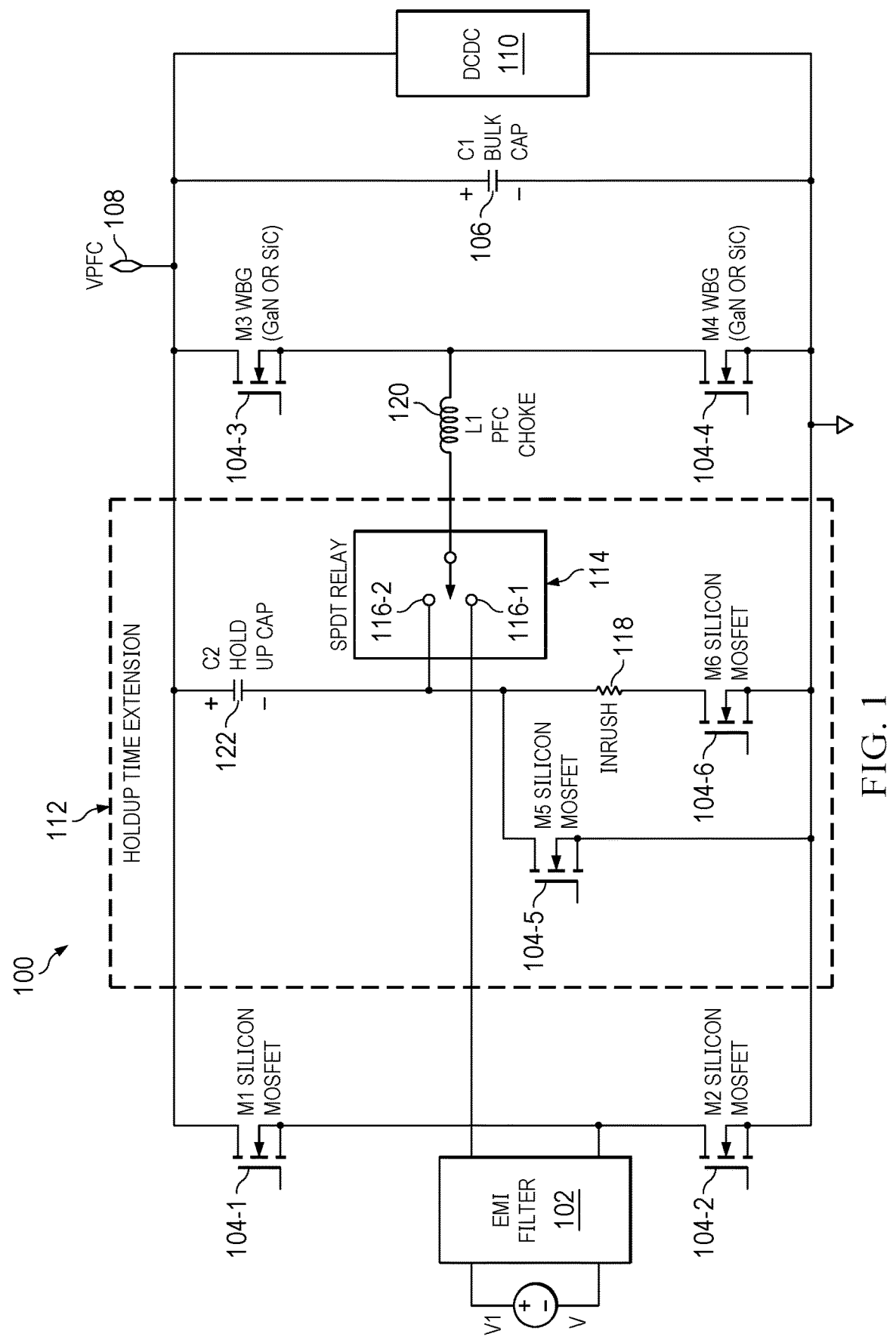
FIG. 1 depicts a schematic diagram of a bridgeless totem pole circuit with a holdup time extension circuit for power factor correction of an information handling system.

In the following description, details are set forth by way of example to facilitate discussion of the disclosed subject matter. It should be apparent to a person of ordinary skill in the field, however, that the disclosed embodiments are examples and not exhaustive of all possible embodiments.

An information handling system (IHS) may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, an IHS may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS may include or have a form factor of that of or similar to one or more of a laptop, a notebook, a telephone, a tablet, and a PDA, among others. For example, a portable IHS may be readily carried and/or transported by a user (e.g., a person). In one or more embodiments, components of an IHS may include one or more storage devices, one or more communications ports for communicating with external devices as well as various input and output (I/O) devices, such as a keyboard, a mouse, and a video display, among others. In one or more embodiments, IHS may include one or more buses operable to transmit communication between or among two or more hardware components. In one example, a bus of an IHS may include one or more of a memory bus, a peripheral bus, and a local bus, among others. In another example, a bus of an IHS may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit (I2C) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, an IHS may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

An IHS may include a processor, a volatile memory medium, non-volatile memory media, an I/O subsystem, and a network interface. Volatile memory medium, non-volatile memory media, I/O subsystem, and network interface may be communicatively coupled to processor. In one or more embodiments, one or more of volatile memory medium, non-volatile memory media, I/O subsystem, and network interface may be communicatively coupled to processor via one or more buses, one or more switches, and/or one or more root complexes, among others. In one example, one or more of a volatile memory medium, non-volatile memory media, an I/O subsystem, a and network interface may be communicatively coupled to the processor via one or more PCI-Express (PCIe) root complexes. In another example, one or more of an I/O subsystem and a network interface may be communicatively coupled to processor via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

A volatile memory medium may include volatile storage such as, for example, RAM, DRAM (dynamic RAM), EDO RAM (extended data out RAM), SRAM (static RAM), etc. One or more of non-volatile memory media may include nonvolatile storage such as, for example, a read only memory (ROM), a programmable ROM (PROM), an erasable PROM (EPROM), an electrically erasable PROM, NVRAM (non-volatile RAM), ferroelectric RAM (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, a network interface may be utilized in communicating with one or more networks and/or one or more other information handling systems. In one example, network interface may enable an IHS to communicate via a network utilizing a suitable transmission protocol and/or standard. In a second example, a network interface may be coupled to a wired network. In a third example, a network interface may be coupled to an optical network. In another example, a network interface may be coupled to a wireless network. In one instance, the wireless network may include a cellular telephone network. In a second instance, the wireless network may include a satellite telephone network. In another instance, the wireless network may include a wireless Ethernet network (e.g., a Wi-Fi network, an IEEE 802.11 network, etc.).

In one or more embodiments, a network interface may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, a processor may execute processor instructions in implementing at least a portion of one or more systems, at least a portion of one or more flowcharts, at least a portion of one or more methods, and/or at least a portion of one or more processes. In one example, a processor may execute processor instructions from one or more memory media in implementing at least a portion of one or more systems, at least a portion of one or more flowcharts, at least a portion of one or more methods, and/or at least a portion of one or more processes. In another example, a processor may execute processor instructions via a network interface in implementing at least a portion of one or more systems, at least a portion of one or more flowcharts, at least a portion of one or more methods, and/or at least a portion of one or more processes.

In one or more embodiments, a processor may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, a processor may interpret and/or execute program instructions and/or process data stored locally (e.g., via memory media and/or another component of an IHS). In another example, a processor may interpret and/or execute program instructions and/or process data stored remotely (e.g., via a network storage resource).

In one or more embodiments, an I/O subsystem may represent a variety of communication interfaces, graphics interfaces, video interfaces, user input interfaces, and/or peripheral interfaces, among others. For example, an I/O subsystem may include one or more of a touch panel and a display adapter, among others. For instance, a touch panel may include circuitry that enables touch functionality in conjunction with a display that is driven by a display adapter.

A non-volatile memory medium may include an operating system (OS) and applications (APPs). In one or more embodiments, one or more of an OS and APPs may include processor instructions executable by a processor. In one example, a processor may execute processor instructions of one or more of OS and APPs via a non-volatile memory medium. In another example, one or more portions of the processor instructions of one or more of an OS and APPs may be transferred to a volatile memory medium and a processor may execute the one or more portions of the processor instructions.

Non-volatile memory medium may include information handling system firmware (IHSFW). In one or more embodiments, IHSFW may include processor instructions executable by a processor. For example, IHSFW may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, a processor may execute processor instructions of IHSFW via non-volatile memory medium. In another instance, one or more portions of the processor instructions of IHSFW may be transferred to volatile memory medium, and processor may execute the one or more portions of the processor instructions of IHSFW via volatile memory medium.

Information handling systems such as those described above require electrical power to perform. Power is supplied by a Power Supply Unit (PSU). A typical server PSU design is required to meet 10 msec hold time or Ride-Thru. However, based on current market power density trends, power density of information handling systems continues to increase with current targets of 65 W/in³ in some form factors and 95 W/in³ in other form factors. On top of these requirements, the PSUs need to meet other criteria, resulting in a decrease in the area inside the PSU for a bulk capacitor.

The capacitor energy may be defined as $1/2C_{BULK}$ ($V^2_{PFC}$–$V^2_{PFCSTOP}$), wherein a straightforward solution is to increase capacitance. However, this approach will limit the remaining space inside the PSU for actual power conversion.

Another approach is to increase the working PFC Bulk voltage ($V_{PFC}$) since the capacitor energy is dependent on voltage. However, this means the PFC will be operating in a higher voltage which will impact overall PSU efficiency and run counter-objective to meeting some operating requirements.

Another alternative is to reduce the minimum voltage (e.g., $V_{PFCSTOP}$) for a converter to maintain output regulation. However, this means the converter cannot operate in an optimum duty cycle to meet best efficiency and also needs to consider higher RMS currents.

Another problem is that when the input Voltage ($V_{IN}$) recovers (e.g., after 10 msec), the PSU needs to continue operation. However, since the PFC Bulk Voltage has already dropped, there is a inrush current if/when the input resumes at higher voltages.

There may be instances in which power supply is interrupted such that an information handling system is likely to shut down. Embodiments may provide additional hold-up electrical power when a main power source is disconnected or interrupted.

Turning now to FIG. 1, an example bridgeless totem pole power factor correction (PFC) circuit 100 in a power supply unit (PSU) may be configured with an embodiment of a holdup time extension circuit 112 positioned between power supply unit (PSU) 10 and converter 110.

PSU 10 may receive electrical power at a voltage (e.g., V1) and may include an electromagnetic interference (EMI) filter 102. Converter 110 may receive electrical power from EMI filter 102 and convert the electrical power to a second voltage (e.g., converter 110 may be a DC-DC converter).

Bridgeless totem pole PFC circuit 100 also includes switches 104 (represented here by metal-oxide semiconductor field-effect transistors (MOSFETs) 104-1, 104-2, 104-3 and 104-4), capacitor 106 (which may also be referred to as bulk capacitor 106), inductor 120 (which may also be referred to as PFC choke 120) and relay 114.

In some embodiments, switches 104-1 and 104-2 may be slow action silicon MOSFETs 104 whose action follows the polarity of the input voltage. In some embodiments, switches 104-3 and 104-4 may be wide band gap (WBG) type FETs 104 which act either as a PFC MOSFET 104 or as a PFC Synchronous Rectifier depending on the polarity of the input voltage. In some embodiments, capacitor 106 may be referred to as bulk capacitor 106.

Relay 114 may be, for example, a single-pole double-throw (SPDT) relay 114. Relay 114 may have two poles, wherein a first pole 116-1 connects PFC choke 120 to EMI filter 102 and a second pole 116-2 connects hold-up time extension 112 to converter 110.

Figure 2:
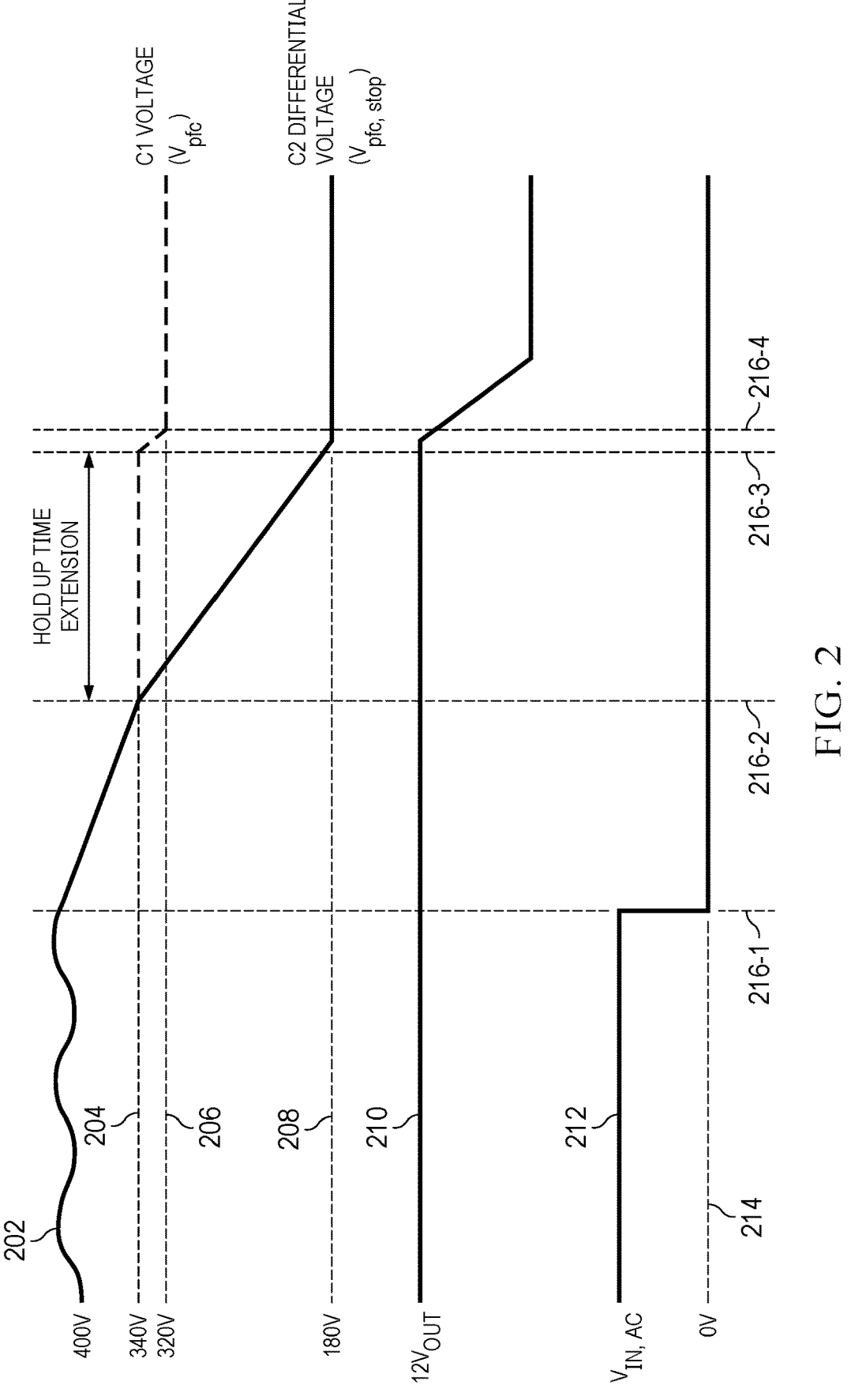
FIG. 2 depicts a chart of an expected waveform corresponding to a bridgeless totem pole circuit with a holdup time extension circuit for power factor correction of an information handling system.

FIG. 2 depicts a diagram illustrating expected voltages in bridgeless totem pole PFC circuit 100 during normal operation and different power loss scenarios. Line 202 represents an expected waveform during normal operation, line 204 represents a minimum expected voltage during normal operation, line 206 represents C1 voltage (e.g., voltage stored in capacitor 106 or $V_{PFC}$), line 208 represents C2 differential voltage (e.g., voltage stored in capacitor 122 or $V_{PFCSTOP}$), line 212 represents an output voltage (e.g., voltage provided by converter 110), line 212 represents input voltage ($V_{IN}$) supplied to PSU 10 and line 214 represents no power (e.g., 0 V).

A first period between a start and point 216-1 represents normal operation, discussed in greater detail below. Point 216-1 represents a period when power is lost (e.g., $V_{IN}$ is 0 V), wherein the portion between point 216-1 and 216-2 represents a time extension period in which energy is stored in an inductor (e.g., PFC choke 120), the portion between point 216-2 and 216-3 represents a hold-up time extension period in which energy is transferred from inductor 120 (e.g., PFC choke 120) to bulk capacitor 106, and the portion between point 216-3 and 216-4 represents a period in which an information handling system begins powering down.

Normal Operation

Figure 3:
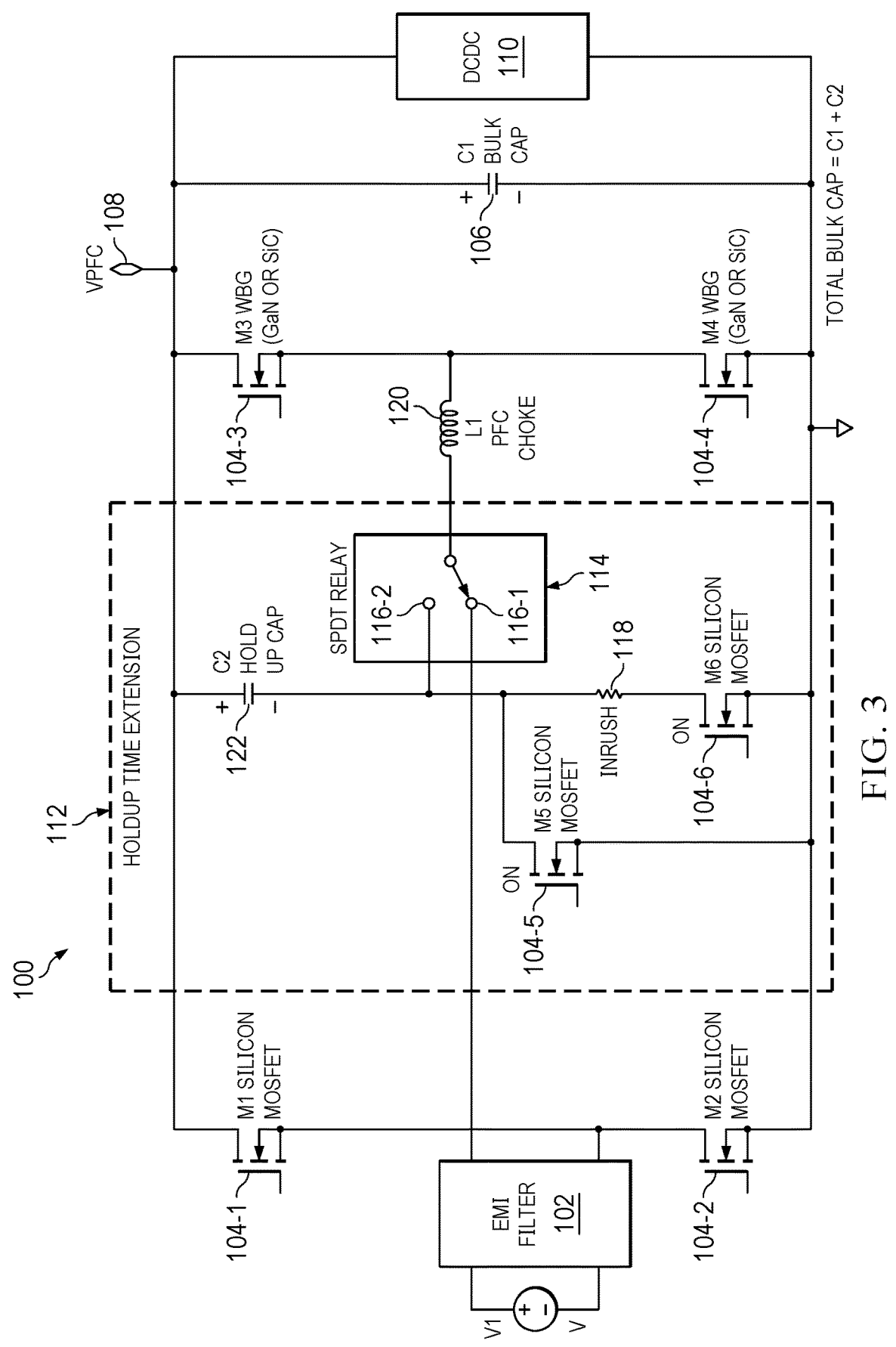
FIG. 3 depicts the schematic diagram of a bridgeless totem pole circuit with a holdup time extension circuit depicted in FIG. 1 during normal operation as a bridgeless totem pole PFC.

Referring to FIG. 3 and the period prior to point 216-1 in FIG. 2, under normal operation, electrical power is supplied to PSU 10 at a voltage level (e.g., $V_{IN}$), wherein relay 114 may be configured with pole 116-1 connecting EMI filter 102 to PFC choke 120. Switches 104-1, 104-2, 104-3 and 104-4 may be configured to route power to converter 110 configured to provide voltage at a second level (e.g., $12V_{OUT}$ represented by line 210). Voltage at bulk capacitor 106 may be maintained at a preferred voltage (e.g., substantially 320 V represented by line 206) and switches 104-5 and 104-6 are ON, wherein total bulk capacitance includes capacitance associated with bulk capacitor 106 and capacitance associated with hold-up capacitor 122. During this time, bulk capacitor 106 and hold-up capacitor 122 may be fully charged.

Figure 4:
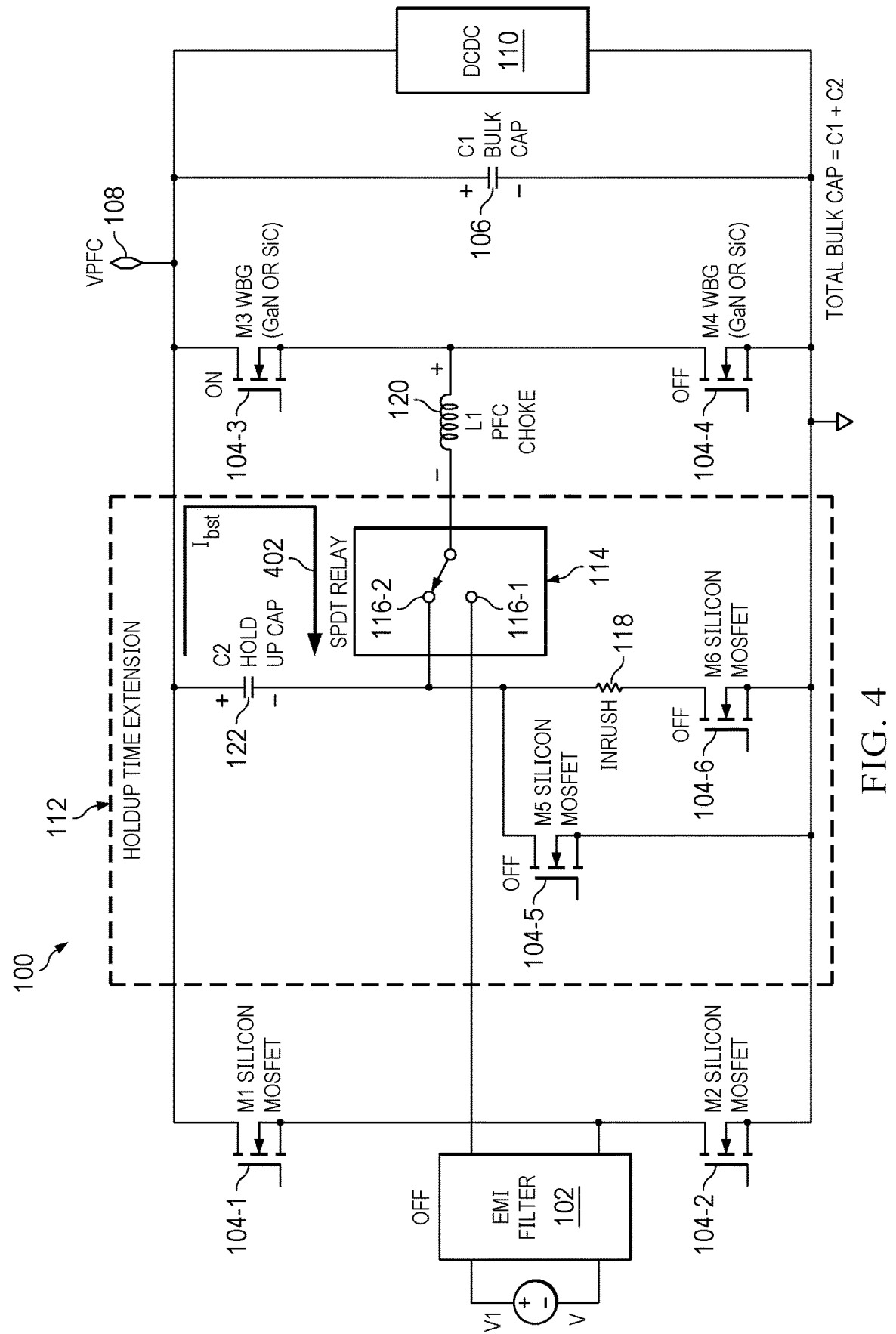
FIG. 4 depicts the schematic diagram of a bridgeless totem pole circuit with a holdup time extension circuit depicted in FIG. 1 when power is removed from the bridgeless totem pole PFC, illustrating energy storage in an inductor.

At Onset of Power Loss, Energy is Initially Stored in an Inductor (PFC Choke)—Boost Converter Action Referring to FIG. 4 and the period between point 216-1 and 216-2 in FIG. 2, if input power is lost or otherwise drops below a performance threshold (e.g., line 212 drops to 0 V), embodiments may initiate a first step of a hold-up time extension mode to ensure power supplied to an information handling system is maintained above a threshold voltage level (e.g., 180 V). Relay 114 may switch connection from first pole 116-1 (e.g., connecting EMI filter 102 to converter 110) to second pole 116-2 (e.g., connecting holdup capacitor 122 to PFC choke 120, switch 104-5 and inrush resistor 118) after the current in PFC choke 120 goes to 0 amps. At this point, switches 104-5 and 104-6 turn OFF, wherein a circuit defined by hold-up capacitor 122, PFC choke 120, switches 104-3 and 104-4 and bulk capacitor 106 may operate as a boost circuit such that voltage in bulk capacitor 106 may be maintained to keep voltage at converter 110 in regulation.

Figure 5:
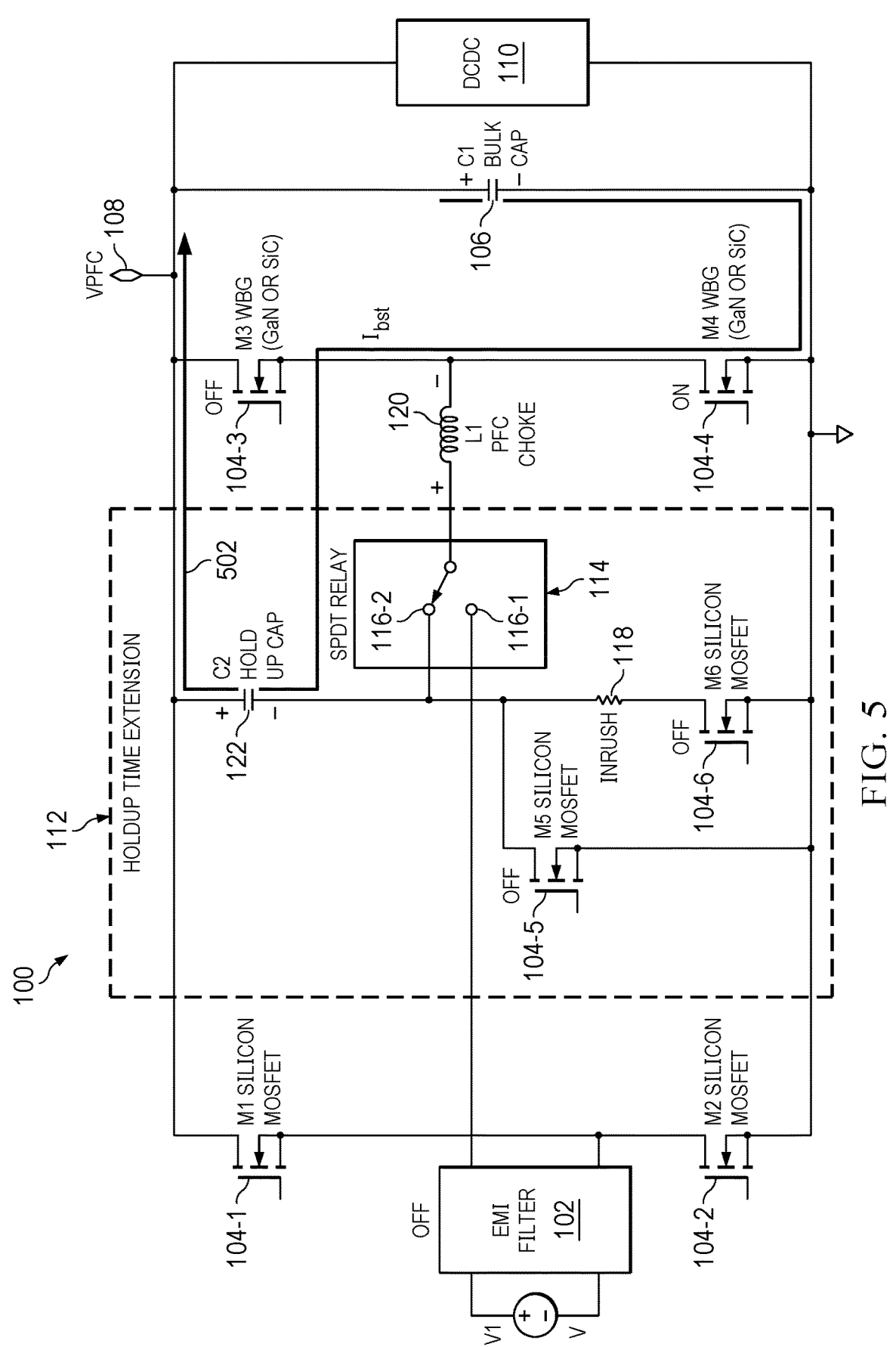
FIG. 5 depicts the schematic diagram of a bridgeless totem pole circuit with a holdup time extension circuit depicted in FIG. 1 when power is removed from the bridgeless totem pole PFC, illustrating energy stored in the inductor being transferred to a capacitor.

During Continued Power Loss, Energy is Transferred from PFC Choke (Inductor) to Bulk Capacitor-Boost Converter Action Referring to FIG. 5 and the period between points 216-2 and 216-3 in FIG. 2, unless power is restored to circuit 100, energy stored in inductor 120 is transferred to bulk capacitor 106 during the period between point 216-2 and point 216-3. In some embodiments, switch 104-3 turns OFF and switch 104-4 turns ON, maintaining voltage ($V_{PFC}$) across bulk capacitor 106 above a minimum threshold (e.g., above line

9

208) for sufficient time to enable converter 110 to continue operation and maintain output regulation 210 (e.g., 12V$_{OUT}$ remains constant).

If power is not restored before a minimum capacitance threshold (e.g., referring to point 216-4 in FIG. 2), then PSU 10 and an information handling system receiving power from PSU 10 may begin powering down.

Power Recovery (V$_{C2}$<V$_{C1}$)

Figure 6:
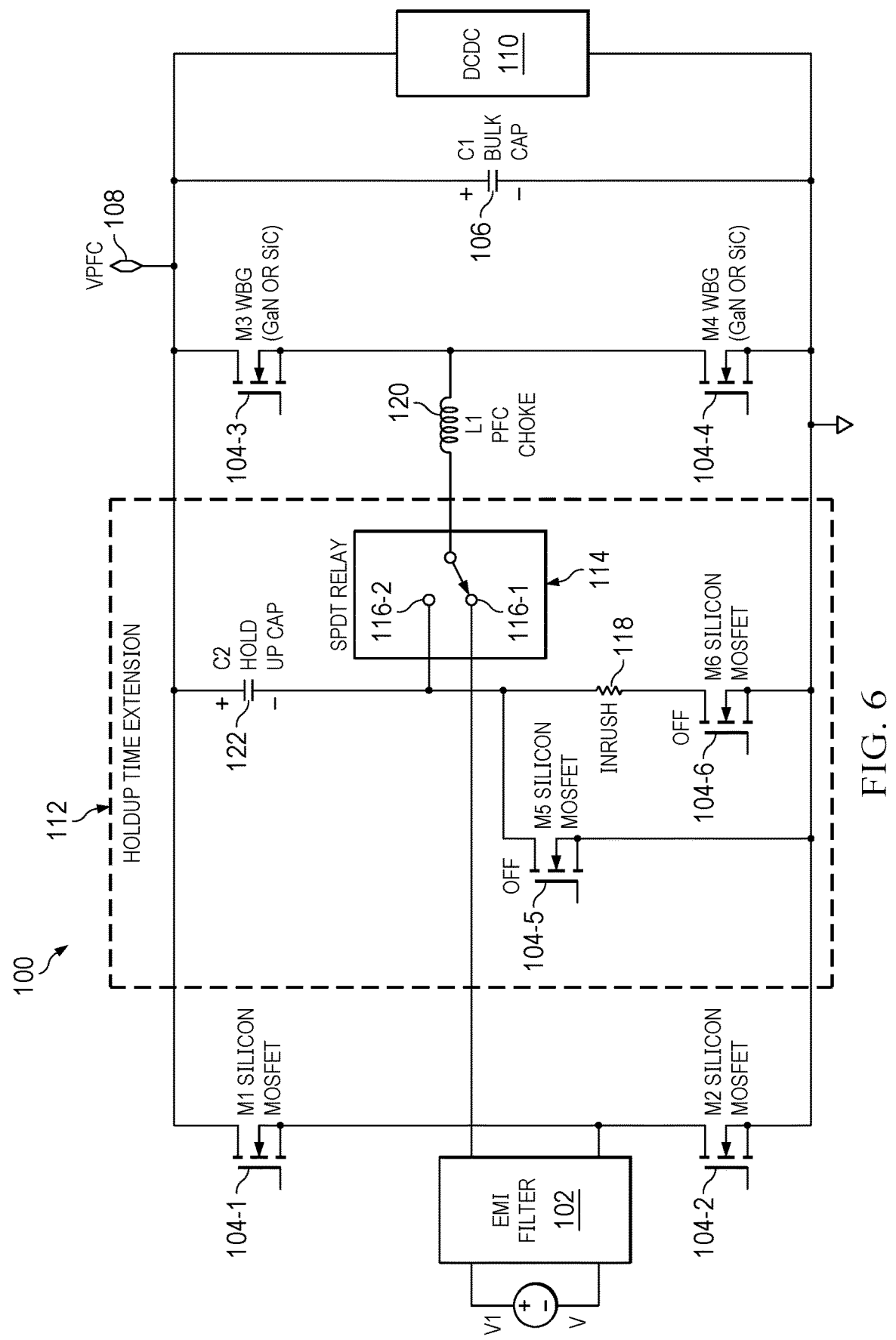
FIG. 6 depicts the schematic diagram of a bridgeless totem pole circuit with a holdup time extension circuit depicted in FIG. 1, illustrating when power is returned to the bridgeless totem pole PFC after a power loss.

Referring to FIG. 6, if the power supplied to PSU 10 returns to a nominal voltage (e.g., PSU 10 receives electrical power at a voltage at or above a minimum voltage level), totem pole circuit 100 may operate as a bridgeless totem pole PFC circuit 100.

As noted above, reconnecting bulk capacitor 106 to hold-up capacitor 122 can overstress PFC circuit 100. Embodiments may return to normal operations in two steps. For example, relay 114 may connect PFC choke 120 with second pole 116-1 and switch 104-6 may turn ON first. Electrical power flows through a first sub-branch containing inrush resistor 118 and switch 104-6 to charge hold-up capacitor 122 to the same voltage as bulk capacitor 106, wherein inrush resistor 118 limits the charging current of hold-up capacitor 122. When the capacitance of hold-up capacitor 122 is approximately equal to the capacitance of bulk capacitor 106, as a second step, switch 104-5 may turn ON, allowing electrical power to bypass inrush capacitor 122 (e.g., the lack of a resistor in a second sub-branch results in electrical power flowing through the second sub-branch) such that hold-up capacitor 122 may fully charge.

Reintroduction of Hold-Up Capacitor as Additional Bulk Capacitance

Figure 7:
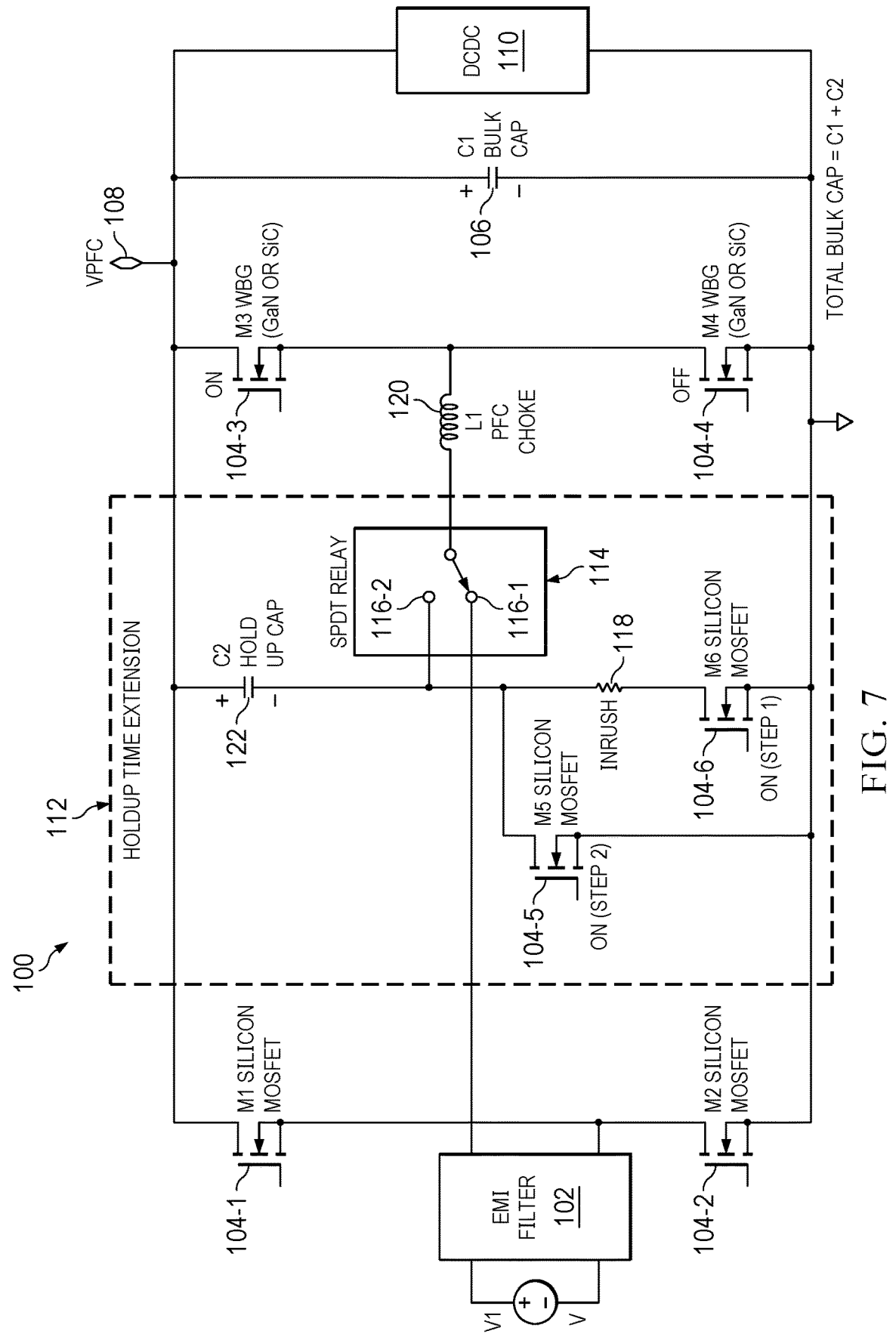
FIG. 7 depicts the schematic diagram of a bridgeless totem pole circuit with a holdup time extension circuit depicted in FIG. 1, illustrating a method for returning power to the bridgeless totem pole PFC after a power loss.

Referring to FIG. 7, once the capacitance of hold-up capacitor 122 nears the capacitance of bulk capacitor 106, relay 114 may connect to first pole 116-1 to restore normal operation of PSU 10.

Figure 8:
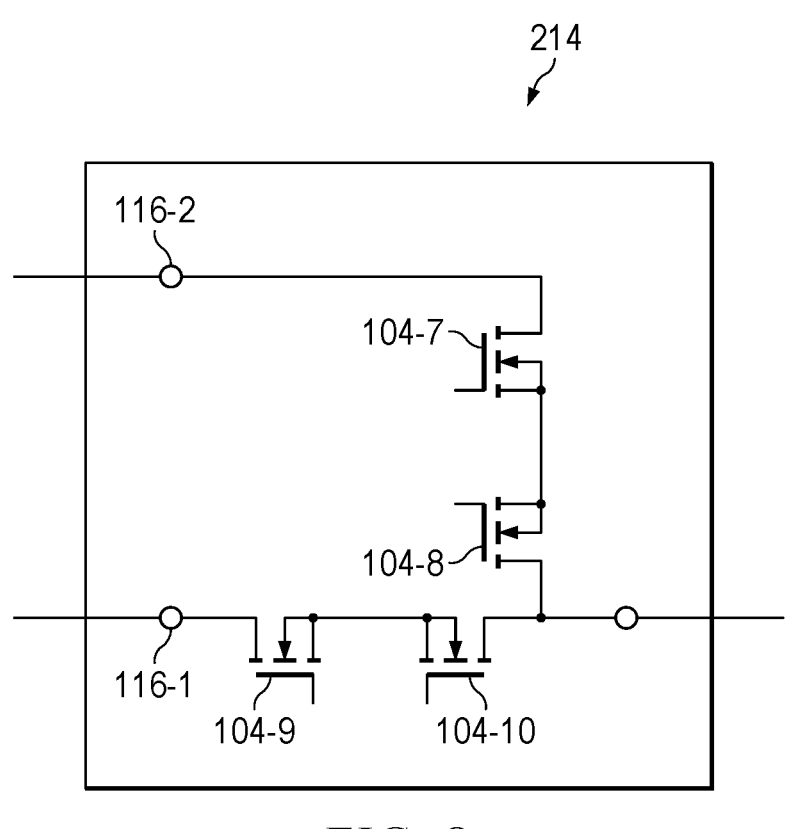
FIG. 8 depicts an embodiment of a relay comprising MOSFETs.

Referring to FIG. 8, in some embodiments, relay 114 may be replaced by relay 214, which may operate similar to single pole dual throw relay 114 but implemented with a plurality of MOSFETs 104, wherein MOSFETs 104-9 and 104-10 may operate as first pole 116-1 an MOSFETs 104-7 and 104-8 may operate as second pole 116-2.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A hold-up time extension circuit for a power factor correction (PFC) circuit in a power supply unit (PSU) of an information processing system, the hold-up time extension circuit comprising:

a relay between a power source and a PFC choke;
a first branch connected to a first pole of the relay, the first branch comprising a hold-up capacitor; and
a second branch connected to a second pole of the relay, the second branch comprising:
a first sub-branch comprising a first switch and an inrush resistor between the first switch and the relay; and
a second sub-branch comprising a second switch connected to the first branch between the inrush resistor and the relay,
wherein in a first configuration associated with power received from the power source dropping below a first voltage level, the relay activates the first branch, wherein power from the hold-up capacitor energizes a bulk capacitor,
wherein in a second configuration associated with receiving power from the power source, the relay activates the second branch to charge the hold-up capacitor.

2. The hold-up time extension circuit of claim 1, wherein the relay is a single pole dual throw (SPDT) relay.

3. The hold-up time extension circuit of claim 1, wherein one or more of the first switch and the second switch comprises a metal-oxide semiconductor field-effect transistor.

4. The hold-up time extension circuit of claim 1, wherein:
in the second configuration, a first step comprises power flowing through the first sub-branch and a second step comprises power flowing through the second sub-branch.

5. The hold-up time extension circuit of claim 1, further comprising an electromagnetic interference (EMI) filter between the power source and the PFC choke.

6. A power factor correction (PFC) circuit in a power supply unit (PSU) of an information processing system, the PFC circuit comprising:
a bulk capacitor;
a PFC choke;
a plurality of switches; and
a hold-up time extension circuit comprising:
a relay between a power source and the PFC choke, wherein in a first configuration associated with normal operation,
a first branch connected to a first pole of the relay, the first branch comprising a hold-up capacitor; and
a second branch connected to a second pole of the relay, the second branch comprising:
a first sub-branch comprising a first switch and an inrush resistor between the first switch and the relay; and
a second sub-branch comprising a second switch connected to the first branch between the inrush resistor and the relay,
wherein in the first configuration associated with power received from the power source dropping below a first voltage level, the relay activates the first branch, wherein power from the hold-up capacitor energizes the bulk capacitor,
wherein in a second configuration associated with receiving power from the power source, the relay activates the second branch to charge the hold-up capacitor.

7. The PFC circuit of claim 6, wherein the relay is a single pole dual throw (SPDT) relay.

8. The PFC circuit of claim 6, wherein one or more of the first switch and the second switch comprises a metal-oxide semiconductor field-effect transistor.

9. The PFC circuit of claim 6, wherein:
in the second configuration, a first step comprises power flowing through the first sub-branch and a second step comprises power flowing through the second sub-branch.

10. The PFC circuit of claim 6, further comprising an electromagnetic interference (EMI) filter between the power source and the PFC choke.

11. A method of operating a power supply unit (PSU) comprising a first switch, a second switch, a third switch, a fourth switch, a bulk capacitor and a power factor correction (PFC) choke forming a PFC circuit, the method comprising:
detecting an input voltage corresponding to at least a nominal voltage; and configuring a relay for normal operation, wherein a first node of the relay connects an electromagnetic interference (EMI) filter to the PFC choke; and wherein the first switch, the second switch, the third switch and the fourth switch are turned on and a fifth switch and a sixth switch associated with a hold-up circuit are turned off.

12. The method of claim 11, wherein in response to detecting a drop in the input voltage below a minimum operating threshold voltage, the method comprises:

the relay switching connection from the first node to a second node connecting a hold-up capacitor, the fifth switch, and an inrush resistor; and turning off the fifth switch and the sixth switch;

wherein the circuit defined by the hold-up capacitor, the PFC choke, the third switch, the fourth switch and the bulk capacitor form a boost circuit such that voltage corresponding to the bulk capacitor is maintained to keep the converter operating in regulation.

13. The method of claim 12, wherein the relay switching connection occurs after current in the PFC choke goes to 0 Amps.

14. The method of claim 12, further comprising:

determining the input voltage is greater than a minimum threshold voltage;

configuring the relay to switch from the second node to the first node, wherein the fifth switch and the sixth switch remain off, wherein the PFC circuit operates to increase the voltage in the hold-up capacitor, wherein capacitance of the hold-up capacitor is less than the capacitance of the bulk capacitor.

15. The method of claim 14, wherein once a voltage in the PFC circuit returns to the nominal voltage, the method further comprises:

turning the sixth switch on to charge the hold-up capacitor to the same voltage as the bulk capacitor, wherein the inrush resistor limits the charging current to the hold-up capacitor;

once the voltage in the hold-up capacitor equals the voltage in the bulk capacitor, turning the fifth switch on to bypass the inrush resistor, wherein the bulk capacitor and the hold-up capacitor are in parallel.

16. The method of claim 11, further comprising transferring energy stored in the PFC choke to the bulk capacitor, comprising turning the third switch off and the fourth switch on.

\* \* \* \* \*